(12) United States Patent
Adams

(10) Patent No.: US 12,545,212 B1
(45) Date of Patent: Feb. 10, 2026

(54) INTEGRATED AUTOMOBILE KEY AND EARBUD DEVICE

(71) Applicant: I.AM.SYMBOLIC LLC, Los Angeles, CA (US)

(72) Inventor: William Adams, Los Angeles, CA (US)

(73) Assignee: I.AM.SYMBOLIC, LLC, Los Angeles, CA (US)

( * ) Notice: Subject to any disclaimer, the term of this patent is extended or adjusted under 35 U.S.C. 154(b) by 0 days.

(21) Appl. No.: 18/078,314

(22) Filed: Dec. 9, 2022

Related U.S. Application Data

(60) Provisional application No. 63/288,384, filed on Dec. 10, 2021.

(51) Int. Cl.
*B60R 25/24* (2013.01)
*B60R 25/01* (2013.01)
*H04R 1/10* (2006.01)

(52) U.S. Cl.
CPC ............. *B60R 25/24* (2013.01); *B60R 25/01* (2013.01); *H04R 1/1016* (2013.01); *H04R 1/1025* (2013.01); *H04R 1/1041* (2013.01); *B60R 2325/101* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 2005/0215286 A1* | 9/2005 | Brass ...................... | B60R 25/24 |
| | | | 455/567 |
| 2016/0212522 A1* | 7/2016 | Lee ......................... | B60W 50/14 |
| 2020/0267465 A1* | 8/2020 | Wilson .................. | H04R 1/1041 |
| 2021/0229633 A1* | 7/2021 | DeLong .................. | B60R 25/22 |
| 2021/0374391 A1* | 12/2021 | Jorasch .................. | G06V 40/19 |
| 2022/0075857 A1* | 3/2022 | Chang ..................... | G06F 1/163 |
| 2022/0230456 A1* | 7/2022 | Kasarla ................... | G06F 3/013 |
| 2024/0265082 A1* | 8/2024 | Chang ..................... | G06F 1/1684 |

FOREIGN PATENT DOCUMENTS

| | | | | |
|---|---|---|---|---|
| CN | 101326480 A | * | 12/2008 | ............. G06F 13/14 |
| CN | 203193858 U | * | 9/2013 | |
| CN | 104901723 B | * | 6/2018 | |
| CN | 110341647 A | * | 10/2019 | ............. B60R 25/01 |
| JP | 2001219817 A | * | 8/2001 | |
| JP | 2006135548 A | * | 5/2006 | |

* cited by examiner

*Primary Examiner* — Fekadeselassie Girma
(74) *Attorney, Agent, or Firm* — Workman Nydegger

(57) ABSTRACT

An integrated automobile key and earbud device comprises a power supply integrated within the device and a physical earbud dock integrated within the device. The power supply provides power to the physical earbud dock and is configured to charge one or more earbuds placed within the physical earbud dock. The device also comprises a wireless transmitter integrated within the device. The wireless transmitter is configured to communicate commands to a particular automobile.

10 Claims, 2 Drawing Sheets

INTEGRATED AUTOMOBILE KEY AND EARBUD DEVICE

CROSS-REFERENCE TO RELATED APPLICATIONS

This application claims the benefit of and priority to U.S. Provisional Patent Application Ser. No. 63/288,384 filed on 10 Dec. 2021 and entitled "INTEGRATED AUTOMOBILE KEY AND EARBUD DEVICE," which application is expressly incorporated herein by reference in its entirety.

BACKGROUND

Computer and electronic devices are pervasive throughout today's society. A mere few decades ago, the only electronic device that an individual may have carried on their person was a digital watch. In present time, many individuals carry smart phones, smart watches, earbuds, wireless car keys, and other various assorted digital devices. Each of these devices often has its own charging needs, updating needs, and other unique needs from the user.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include an integrated automobile key and earbud device. The device comprises a power supply integrated within the device and a physical earbud dock integrated within the device. The power supply provides power to the physical earbud dock and is configured to charge one or more earbuds placed within the physical earbud dock. The device also comprises a wireless transmitter integrated within the device. The wireless transmitter is configured to communicate commands to a particular automobile.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments include an integrated automobile key and earbud device. The device comprises an integrated power supply and an integrated physical earbud dock integrated. The power supply provides power to the physical earbud dock and is configured to charge one or more earbuds placed within the physical earbud dock. The device also comprises a wireless transmitter integrated within the device. The wireless transmitter is configured to communicate commands to one or more automobiles.

Figure 1:
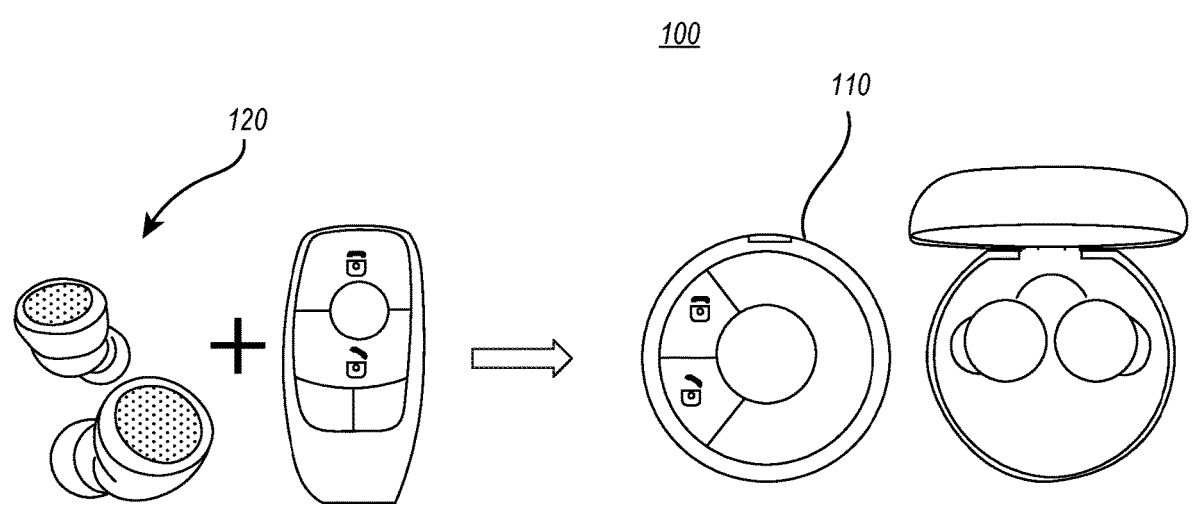
FIG. 1 illustrates an embodiment of an integrated automobile key and earbud device.

FIG. 1 illustrates an embodiment of an integrated automobile key and earbud device 100. As used herein the "device" comprises a case 110 (also referred to herein as a "dock") that can be held in a user's hand and the earbuds 120. The device 100 further comprises an integrated keyless ignition system and/or remote. The integrated keyless ignition system may comprise a wireless transmitter and other components that are common to conventional keyless ignition systems. When in use the device provides a user with the ability to wirelessly start a car, lock car doors, unlock car doors, open one or more doors, open a trunk, arm an alarm, and/or various other features.

The device 100 also comprises a physical earbud dock integrated within the case 120. The earbud case 120 may comprise a mounting surface on the exterior of the device 100 or a compartment within the case 100 for holding one or more earbuds 120. As used herein, earbuds 120 comprise wireless headphones that are individually inserted into a single ear canal. Additionally, a power supply, such as a battery, may be integrated within the device 100. The power supply can provide power to the physical earbud case 110 and charge one or more earbuds 120 placed within the physical earbud dock.

In at least one embodiment, the device 100 may also comprise an electrical plug integrated into a surface of the case 110, wherein the electrical plug is configured to be plugged into an outlet. The electrical plugin may be collapsible such that the electrical prongs fold into the device when not in use. When plugged in the power supply within the device 100 charges and allows the power supply to provide power to the one or more earbuds and to the keyless ignition system and remote.

The device 100 may further comprise a wireless charging circuit that is configured to receive electrical input for charging the power supply within the device 100. For example, the device 100 may comprise an integrated capacitive or inductive charging system such that the device 100 can be charged while resting on a wireless charging pad, such as a Qi charging pad. Such a charging pad may be integrated into the interior of the particular automobile to allow for convenient charging.

Additionally, in at least one embodiment the device 100 further comprises user interface elements. The user interface elements can include a display, one or more lights, one or more speakers, and/or one or more vibrators. For example, the device 100 may provide a display or a series of lights to indicate the charge level of the case 110 and/or the earbuds 120. Further, the device 100 may comprise one or more vibrators or speakers to emit an alert when the device is lost. For example, a user may send out a find request using a smart phone. The device 100 may be connected to the internet through a cellular data modem and/or a WiFi chip integrated within the device 100. The device 100 may receive the find request through a network connection. In response to receiving the find request, the device 100 activates the vibrator, speaker, and/or lights in order to direct a user to the location of the device 100.

Figure 2:
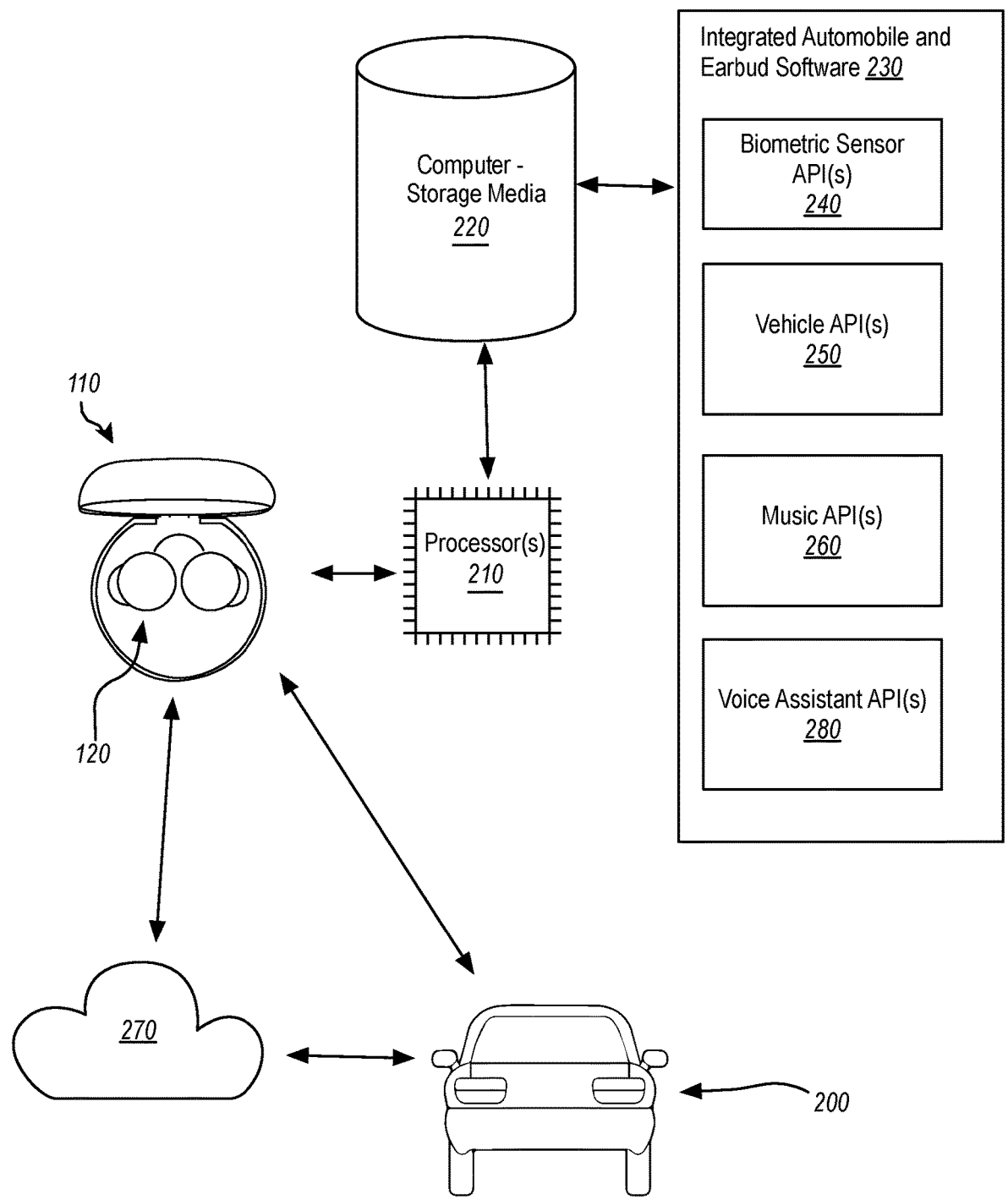
FIG. 2 illustrates a schematic diagram of a system for the use of an integrated automobile key and earbud device.

FIG. 2 illustrates a schematic diagram of a system for the use of an integrated automobile key and earbud device 100. As depicted, the case 110 and the earbuds 120 may be comprise one or more processors 210 and computer-storage media 220 for executing an integrated automobile and earbud software 230 application. The device 100 may further be in communication through a network 270 with a vehicle 200. The integrated automobile and earbud software 230 application may comprise Biometric Sensor API(s) 240 for gathering data from sensors within the device 100, Vehicle API(s) 250 for communicating with a vehicle, Music API(s) 260 for playing music to a user and tracking user music preferences, and Voice Assistant API(s) 280 for interoperating with voice assistant software.

As used herein, an "API" comprises computer executable code and/or computer hardware that performs a particular function. One of skill in the art will appreciate that the distinction between different APIs is at least in part arbitrary and that APIs may be otherwise combined and divided and still remain within the scope of the present disclosure. As such, the description of a component as being a "API" is provided only for the sake of clarity and explanation and should not be interpreted to indicate that a specific structure of computer executable code and/or computer hardware is required, unless expressly stated otherwise. In this description, the terms "module", "component", "agent", "manager", "service", "engine", "virtual machine" or the like may also similarly be used.

In at least one embodiment, the device 100 leverages the cellular data modem and/or a WiFi chip and the Vehicle API 250 to communicate with the automobile 200. For example, the device 100 may be able to communicate a "start" command through the internet 270 to the automobile 200. Further, the earbuds 120 may wirelessly communicate with the case 110. For instance, the earbuds 120 may be in Bluetooth communication with the case 110, while the case 110 is in communication with the automobile 200 through an internet connection. Accordingly, in at least one embodiment, a user may leverage the earbuds 120 to interact with the particular automobile 200 from a distance through the internet 270.

For example, in at least one embodiment, the earbuds 120 may comprise one or more integrated microphones. Using the microphones within the earbuds 120, the user may issue a voice command to the automobile 200. The voice command may be relayed from the earbuds through the case 110 to the automobile 200. In at least one embodiment, the automobile 200 may use local, on-board processing natural language processing abilities to translate the voice commands. Similarly, the automobile 200 may communicate information from itself to a user through the Vehicle API(s) 250 and the earbuds 120. For instance, the automobile 200 may verbally communicate through the earbuds 120 to the user a temperature reading taken by the automobile.

In at least one embodiment, the earbuds 120 may be able to communicate with a vehicle in the absence of the case 110. For example, the earbuds 120 may communicate directly with one or more vehicles through cellular bands, Bluetooth, WIFI, NFC, Ultrawide band (UWB), or any other applicable wireless communication system. A vehicle may be able to detect the presence of the earbuds 120 near the vehicle such that the vehicle automatically unlocks when it detects the earbuds 120 are within a threshold distance of the vehicle. In at least one embodiment, the vehicle determines the distance between the vehicle and the earbuds 120 based upon a strength of signal received by the vehicle from the earbuds 120. Accordingly, in at least one embodiment, a user is able to unlock, start, drive, and otherwise interact with the vehicle with only the earbuds 120.

In contrast, in at least one embodiment, the case 110 may be able to communicate with a vehicle in the absence of the earbuds 120. For example, the case 110 may communicate directly with one or more vehicles through Bluetooth, WIFI, NFC, Ultrawide band (UWB), or any other applicable wireless communication system. A vehicle may be able to detect the presence of the case 110 near the vehicle such that the vehicle automatically unlocks when it detects the case 110 is within a threshold distance of the vehicle. In at least one embodiment, the vehicle determines the distance between the vehicle and the case 110 based upon a strength of signal received by the vehicle from the case 110. Accordingly, in at least one embodiment, a user is able to unlock, start, drive, and otherwise interact with the vehicle 200 with only the case 110.

In at least one embodiment, the earbuds 120 may also gather health metrics from a wearer using the Biometric Sensor API(s) 240. For example, the earbuds 120 may comprise sensors that are able to collect heart rate, oxygen levels, body temperature, steps, force measurements, and other biometric data from a wearer. The earbuds 120 may communicate at least a portion of the biometric data to the device 100, to the vehicle 200, or directly to a server. The vehicle 200 may be configured to respond to and perform various actions based upon the biometric data. For instance, if the biometric data indicates that the user's body temperature is low, the vehicle 200 may preheat or turn on a heater at a higher level when the user approaches the vehicle 200. Additionally, if the biometric data indicates that the user has just finished working out, the vehicle 200 may precool or turn on the air conditioner. The vehicle 200 may further utilize the Music API(s) 260 and play a post-workout cool down playlist over the vehicle radio. Similarly, if the biometric data indicates that the user has a lower step count than normal for the time of day, the vehicle 200 may play upbeat workout music to help motivate the user to be more active. In at least one embodiment, the Music API(s) 260 that are utilized by the vehicle 200 and the device 100 operate with the same music services.

Additionally, in at least one embodiment, the earbuds 120 may be configured to provide a wearer with information specific to the vehicle 200. For example, a wearer may be able to activate a voice assistant using the Voice Assistant API(s) 260. The wearer can then inquire about a charging status of an electric vehicle 200, an amount of time remaining for a full charge, a range of travel based upon current fuel or charge, and various other vehicle specific information. Similarly, a wearer may be able to issue commands through the earbuds 120 to the vehicle 200. For instance, the wearer may be able to command the vehicle to activate an integrated automatic door opener to open a garage door or a gate. Similarly, the wearer may be able to issue a command to start the vehicle 200, start a heater/AC in the vehicle 200, or to schedule a time for the vehicle 200 to perform particular actions. For example, the user may be able to command the vehicle 200 to "turn the heat on high tomorrow morning at 5:30 am." The commands can be communicated through the earbuds 120 to the vehicle, through the case 110, directly to the vehicle, and/or through a network connection.

The earbuds 120 may also be used to provide a walkie-talkie feature to the interior of the car. For example, a wearer may be able to issue a command to activate the walkie-talkie feature. Once activated the wearer may be able to have a conversation with occupants of the vehicle through a built-in microphone and speaker system within the vehicle.

In at least one embodiment, the earbuds 120 may also function as a hands-free phone device within the vehicle 200. For example, if a phone call is received while driving, a wearer may be able to take the call through the earbuds 120. Further, the earbuds 120 may communicate with the vehicle 200, such that the earbuds 120 are better able to cancel out road noise and radio noise from within the vehicle. For example, the vehicle suspension may detect bumps (e.g., rumble strips) in the road. The information from the vehicle suspension may be provided to the earbuds 120 and used as a control signal within a noise cancellation system built-into the earbuds 120. As such, the earbuds 120 may be able to provide a higher level of noise cancellation than would be achievable within the information from the vehicle 200.

The earbuds and device 100 may also serve as a type of biometric lock for the vehicle. For example, in at least one embodiment, the case 110 may comprise a fingerprint scanner that can be used to authenticate a user. Prior to unlocking or otherwise sending commands to the vehicle, a user may be required to scan his or her fingerprint to authenticate their identity. Further, if the user authenticates their identity while wearing the earbuds 120, the earbuds 120 may maintain an authentication token as long as the integrated biometric sensor indicate that the earbuds 120 have not been removed from the user's ears since the authentication. For example, if a user places the earbuds 120 in their ears prior to going into a gym to workout and the user authenticates their identification, the earbuds 120 will maintain an authentication token as long as the earbuds 120 remain in the user's ears. As such, when the user has finished working out and returns to their vehicle 200, the user can open the vehicle 200 and send the vehicle commands without re-authenticating by using the authentication token that is associated with the earbuds 120.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An integrated automobile key and earbud device, comprising:
   a power supply integrated within the device;
   a physical earbud dock integrated within the device, wherein:
      the power supply provides power to the physical earbud dock, and
      the power supply is configured to charge one or more earbuds placed within the physical earbud dock;
   a biometric sensor integrated within the one or more earbuds and configured to collect biometric data;
   wherein the one or more earbuds are configured to receive suspension signals from a particular automobile and to adjust a level of noise cancellation based on the suspension signals; and
   a wireless transmitter integrated within the device, wherein:
      the wireless transmitter is configured to communicate commands to a particular automobile, and
      at least one command is configured to change an environmental control based upon the biometric data.

2. The integrated automobile key and earbud device as recited in claim 1, wherein the commands comprise one or more of a command to open a door of the particular automobile.

3. The integrated automobile key and earbud device as recited in claim 1, wherein the commands comprise one or more of a command to set an alarm within the particular automobile.

4. The integrated automobile key and earbud device as recited in claim 1, further comprising an electrical plug integrated into a surface of the device, wherein the electrical plug is configured to be plugged into an outlet.

5. The integrated automobile key and earbud device as recited in claim 1, further comprising further comprising a wireless charging circuit, the wireless charging circuit configured to receive electrical input for charging the power supply.

6. The integrated automobile key and earbud device as recited in claim 1, further comprising user interface structures, including one or more of one or more lights, one or more speakers, and one or more vibrators.

7. The integrated automobile key and earbud device as recited in claim 1, wherein the biometric sensor comprises a biometric fingerprint scanner configured to authenticate a user to unlock the particular automobile.

8. The integrated automobile key and earbud device as recited in claim 1, further comprising a WiFi chip integrated within the device.

9. An integrated automobile key and earbud device, comprising:
   a power supply integrated within an earbud case;
   a physical earbud dock integrated within the earbud case, wherein:
      the earbud case comprises an internal compartment that is configured to enclose one or more removable earbuds,
      the power supply provides power to the physical earbud dock, and
      the power supply is configured to charge the one or more removable earbuds placed within the physical earbud dock;
   a biometric sensor integrated within the one or more removable earbuds and configured to collect biometric data;
   wherein the one or more removable earbuds are configured to receive suspension signals from a particular automobile and to adjust a level of noise cancellation based on the suspension signals; and
   a wireless transmitter integrated within the earbud case, wherein:
      the wireless transmitter is configured to communicate commands to a particular automobile, and
      at least one command is configured to change an environmental control based upon the biometric data.

10. An integrated automobile key and earbud device, comprising:
    a power supply integrated within an earbud case;
    a physical earbud dock integrated within the earbud case, wherein:
       the earbud case comprises a compartment that is configured to hold one or more removable earbuds;

the power supply provides power to the physical earbud dock, and the power supply is configured to charge one or more earbuds placed within the physical earbud dock;

a biometric sensor integrated within the one or more earbuds and configured to collect biometric data;

wherein the one or more removable earbuds are configured to receive suspension signals from a particular automobile and to adjust a level of noise cancellation based on the suspension signals; and a first wireless transmitter integrated within the one or more earbuds and a second wireless transmitter integrated within the physical earbud dock, wherein:

the first wireless transmitter and the second wireless transmitter are both configured to communicate commands to a particular automobile, and at least one command is configured to change an environmental control based upon the biometric data.

* * * * *